(12) United States Patent
Gonzalez Monroy et al.

(10) Patent No.: US 12,254,315 B2
(45) Date of Patent: Mar. 18, 2025

(54) MACHINE CAPABILITY MODEL FOR SELF-CONFIGURABLE APPLICATIONS

(71) Applicant: Microsoft Technology Licensing, LLC, Redmond, WA (US)

(72) Inventors: Ramiro Gonzalez Monroy, Guadalajara (MX); Jose Mario Carranza Rojas, Santa Barbara (CR); Martin Ellis, Pittsburgh, PA (US); Jizhe Jin, Kirkland, WA (US); Satya Sasikanth Bendapudi, Kirkland, WA (US); Harpreet Kaur, Surrey (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 112 days.

(21) Appl. No.: 18/204,248

(22) Filed: May 31, 2023

(65) Prior Publication Data

US 2024/0354101 A1 Oct. 24, 2024

Related U.S. Application Data

(60) Provisional application No. 63/460,803, filed on Apr. 20, 2023.

(51) Int. Cl.
  G06F 8/71 (2018.01)
  G06F 11/34 (2006.01)
(52) U.S. Cl.
  CPC ............ *G06F 8/71* (2013.01); *G06F 11/3414* (2013.01)

(58) Field of Classification Search
  CPC .............................. G06F 8/71; G06F 11/3414
  See application file for complete search history.

(56) References Cited

U.S. PATENT DOCUMENTS

| | | | | |
|---|---|---|---|---|
| 11,163,557 | B2 * | 11/2021 | Babol | G06F 8/71 |
| 11,606,409 | B1 * | 3/2023 | Ergen | H04L 65/612 |
| 11,847,496 | B2 * | 12/2023 | Sheoran | G06N 3/08 |
| 11,943,275 | B2 * | 3/2024 | Sridhar | H04L 41/40 |
| 12,088,823 | B2 * | 9/2024 | Gu | H04N 19/194 |

(Continued)

OTHER PUBLICATIONS

Mao, et al., "Neural Adaptive Video Streaming with Pensieve", In Proceedings of the Conference of the ACM Special Interest Group on Data Communication, Aug. 7, 2017, pp. 197-210.

(Continued)

*Primary Examiner* — Aurel Prifti
(74) *Attorney, Agent, or Firm* — Schwegman Lundberg & Woessner, P.A.

(57) ABSTRACT

Disclosed in some examples are methods, systems, and machine-readable mediums which customizes application feature settings using ranked clusters from an unsupervised modelling algorithm that clusters similar computing platforms and feature settings templates that map these ranks to feature settings. In some examples, a model may is periodically built using a first set of computing platform properties observed from computing platforms that the application is executing on. These clusters are then ranked using a second set of computing platform properties observed from other computing platforms that the application is executing on and performance data that describes performance of the application on those platforms.

20 Claims, 6 Drawing Sheets

(56) References Cited

U.S. PATENT DOCUMENTS

| | | | |
|---|---|---|---|
| 2015/0301840 A1* | 10/2015 | Goetz | G06F 8/24 |
| | | | 717/166 |
| 2016/0259658 A1* | 9/2016 | Gocek | G06F 9/45558 |
| 2018/0131620 A1* | 5/2018 | Su | H04L 47/2441 |
| 2019/0034243 A1* | 1/2019 | Kramer | G06F 9/4401 |
| 2021/0141636 A1* | 5/2021 | Babol | G06F 8/71 |
| 2022/0303352 A1* | 9/2022 | Herzog | G06N 20/00 |
| 2022/0407906 A1* | 12/2022 | Sridhar | H04L 41/0895 |
| 2022/0413956 A1* | 12/2022 | Mathew | H04L 43/16 |
| 2023/0305892 A1* | 9/2023 | Mathew | H04L 41/5025 |
| 2024/0103850 A1* | 3/2024 | Pierce | G06F 8/34 |
| 2024/0152355 A1* | 5/2024 | Dupont | G06F 8/71 |

OTHER PUBLICATIONS

International Search Report and Written Opinion received for PCT Application No. PCT/US2024/023498, Jul. 30, 2024, 11 pages.

* cited by examiner

MACHINE CAPABILITY MODEL FOR SELF-CONFIGURABLE APPLICATIONS

CROSS-REFERENCE TO RELATED APPLICATION

This application claims priority to U.S. Provisional Application Ser. No. 63/460,803, filed Apr. 20, 2023 which is incorporated herein by reference.

TECHNICAL FIELD

Embodiments pertain to automated application configurations based upon the computing platform it is executing on. Some embodiments relate to utilizing clustering algorithms to cluster the computing platform into a prespecified cluster that has an assigned rank which is used to implement per-feature customizations.

BACKGROUND

Modern computer software applications are complex with a number of complex features. For example, real time communication applications (RTC) provide a variety of features such as audio calls, chats, video, screensharing, background blur, background noise removal, and other capabilities at different quality settings, resolutions, framerates, and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
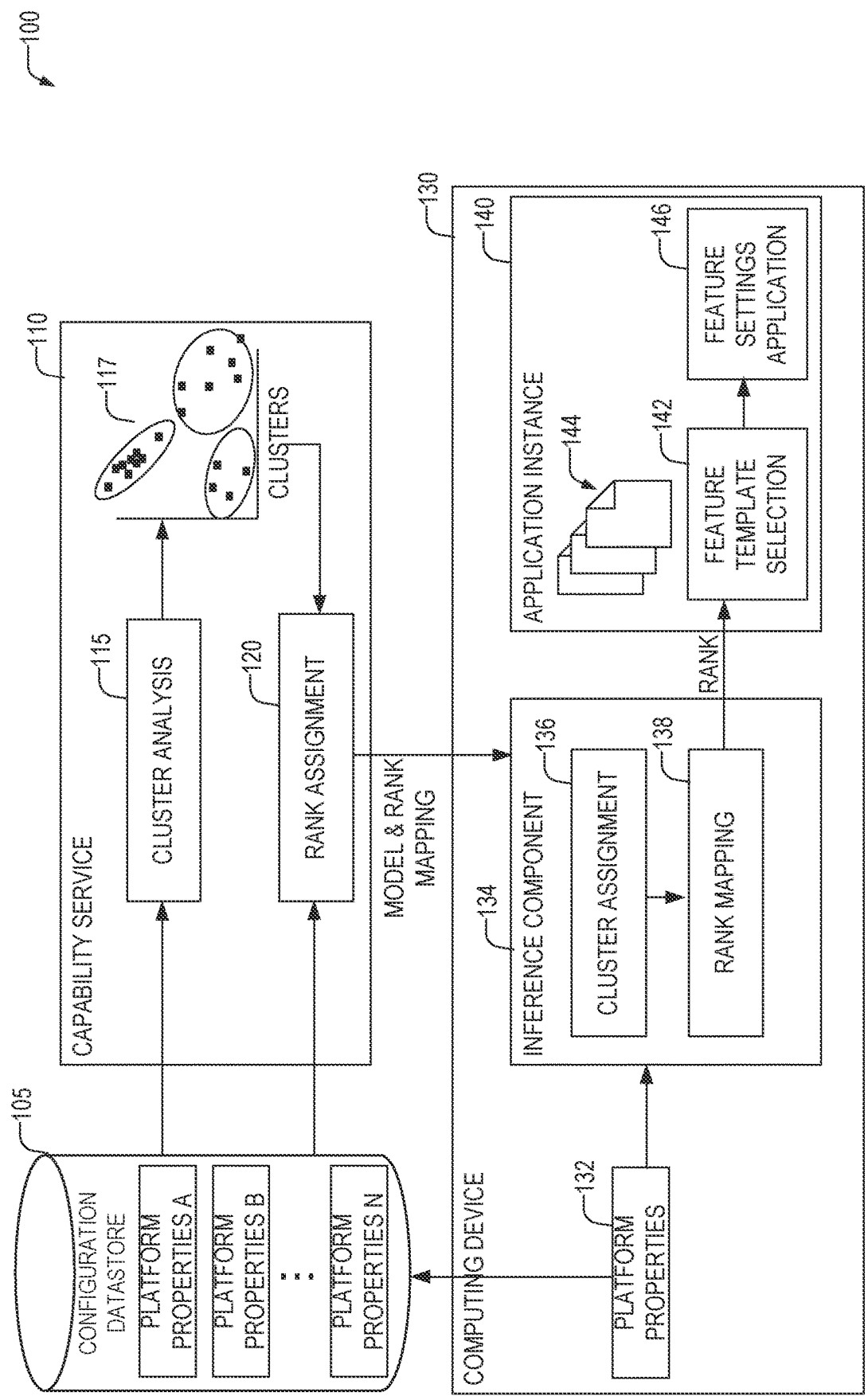
FIG. 1 illustrates a system diagram of a feature modification system based upon platform information according to some examples of the present disclosure.

The variety of computing platforms that an application instance may execute on are highly variable. For example, modern personal computers have a variety of hardware and parts from a variety of different vendors with a variety of different operating systems like Windows® and Linux. In addition to the variety of hardware and software that may be utilized in a PC, the prevalence of Mac from Apple®, tablets, mobile phones, and the like provide a nearly limitless landscape of potential hardware and software combinations that an application may execute on.

To maintain optimal performance, applications need to adapt to these various platform configurations. For example, for RTC applications, features such as machine learning (ML) and deep learning models (for example, echo cancellation, noise suppression, background blur/removal) are very taxing on some weaker hardware. In these examples, trying to provide these features, or trying to provide these features at a same quality as that provided on more capable platforms may in turn lead to lower performance of the RTC applications, resulting in a degraded end-user experience. In some extreme cases, a misconfigured RTC application may impact both the user experience of the user whose application is misconfigured and also other participants in the shared communication session.

A potential solution is to have specific hard-coded and static configuration sets. That is, a list of hardware and/or software and specific feature settings for that hardware and/or software. Any such approach has to account for an almost infinite amount of device configurations. Given the frantic pace at which hardware is developing, and the long history of such hardware, simply maintaining an up-to-date list of hardware is untenable. This problem also creates issues for supervised machine-learning approaches as there is no clear training supervision signal for all those potential device configurations. Another solution is to monitor performance as the application is executing and adjust the settings of the application based upon that performance. For example, many streaming services start out at a lower quality and ramp up to higher qualities based upon network performances. The problem with these techniques is finding an appropriate starting point that maximizes performance for the majority of users. For example, if the application starts out with settings geared for a lower performance platform to accommodate the lower performing platforms, the experience for the users with higher performing platforms is degraded. In other examples, if the application starts out with settings geared for a higher performance platform, the experience for users with lower performing platforms may be degraded. This may not be acceptable. For example, in the video streaming services example, by the time the algorithm adjusts the resolution to accommodate a higher performing platform, a short video may be almost completely watched—degrading the entire experience.

Disclosed in some examples are methods, systems, and machine-readable mediums which automatically customize application feature settings to optimized settings upon application instance startup for a computing platform. The system uses an unsupervised clustering algorithm to cluster similar computing platforms together to create a cluster model. The clusters in the model are then ranked (e.g., using previously captured performance data), and feature settings are determined based upon the ranking. A plurality of feature settings for a given rank are aggregated to create feature setting templates. Upon execution of an application instance, the platform that the application instance is executing on is assigned to one of the clusters. A feature setting template is then identified based upon the assigned rank of the cluster. Feature settings are then applied to the features of the application instance based upon the feature settings in the feature setting template. The feature settings may be fine-tuned such that the feature provides optimal performance for all computing platforms within a given rank.

The disclosed methods thus utilize information available to the application instance upon execution without having to rely upon later collected in-execution performance metrics. At the same time, the use of these clustering algorithms ensures a good performance level for the application instance that provides the best user experience by providing the optimal feature settings. The present system thus solves the technical problem of poor application instance performance due to varied computing platforms with a technical solution of: utilizing previously created clustering models to find similar computing platforms quickly and accurately, quickly assess a single numerical indicator of performance of that cluster (e.g., rank), and applying feature settings customized to those rankings.

As used herein, a computing platform may include the hardware of the computing device that the application instance is executing on and the software platform that provides services to the application (e.g., by interfacing with the hardware). Example hardware includes the central processing unit (CPU), Random Access Memory (RAM), storage device, motherboard, network interfaces, display, and the like. Example software platforms include the operating system and other software applications that interface with the software application instance. Example software applications include drivers (e.g., that expose functionality of the hardware to software applications), frameworks (e.g., .NET framework, JAVA frameworks), and for browser-based applications—the browsers executing the application instance.

One or more platform properties may include hardware properties and/or software properties. Hardware properties describe one or more hardware devices of the computing platform. Hardware properties may include a CPU identifier, a number of CPU cores, a size of RAM, a type of RAM (Dual Data Rate (DDR)3, DDR4, DDR5), a speed of the RAM, a type of storage that the application is stored on or uses as storage; a speed of the storage that the application is stored on or uses as storage, network adapter type and speed, the device type (e.g., tablet, desktop, laptop, phone), and the like. Software properties may include software environment information, such as for example, one or more software versions. Examples include Operating System (O/S) information such as major and minor versions, whether the application is executing within a virtual machine, driver versions, framework versions, or the like.

In some examples, the system first trains the model. In this phase, a plurality of observed platform properties of platforms executing the application are used to train an unsupervised machine-learning model to produce a model that clusters similar platforms into a number of groups or clusters. The number of groups may be found by using the silhouette score by assessing the cohesion and spread of the respective groupings. This allows the model to rely upon static information of the device that does not depend upon application performance metrics. For certain hardware features, such as CPU name, encoders may be used to map those features to floating point numbers. The encoders may be based on frequency of appearance to learn a mapping from the category to float numbers. The encoder sorts CPU names by their relative frequency to compute the statistics of how many devices use that CPU. In turn those statistics are used to generate the float number conversion. The model uses such float numbers during training. Mappings from the text to float numbers may be stored in dictionaries inside the final model for future inference. When the model runs the inference for a certain CPU name, the model will look up into the dictionary to match to its corresponding float value, computed in the encoder when it was trained.

In some examples, to validate the model, a different set of data comprising a plurality of observed platform properties of platforms executing the application may be used to cluster each of the platforms using the model. Performance metrics of those platforms taken during application execution: such as CPU/memory usage and frequency, subjective user performance ratings (e.g., user feedback on performance), and other metrics may be used to produce a ranking score for each cluster. That is, the clusters created during model training are assigned one or more "ranks" that identify a relative performance of platforms assigned to a particular cluster compared to other platforms assigned to a different cluster. That is, platforms assigned to rank 10 may achieve better performance than platforms assigned to rank 1 (or vice versa).

Once the model is built and ranks assigned, the model and ranks are used in an inference phase. Note that the model may be periodically rebuilt and/or recalibrated—however, this may require recalibrating the settings in the feature templates to change the settings of each feature based upon the updated ranks.

For the inference phase, platform properties, such as hardware and software environment information, is collected when an application instance is executed on a computing platform. The platform properties are used to place the current platform into one of the clusters. The identified cluster is then mapped to its assigned rank. The assigned rank is used by features of the application to customize settings. This process may be done once upon installation of an application instance, once the first time that the application instance executes on the platform, every time upon startup of the application instance, once upon installation or first startup and then during startup upon detection of a change of hardware or software of the platform, periodically upon startup of the application instance, and the like.

Feature setting templates may comprise one or more feature settings for a particular rank. In some examples, a feature may require a minimum rank to be enabled. Thus, if the rank of the device is below the minimum required, the feature settings indicate that the feature will be disabled. In some examples, certain application features may be modified based upon the rank. For example, features involving video may modify a video resolution based upon the hardware rank. Example feature settings may include quality settings, framerate settings, codec settings, whether the feature is even enabled or not, and the like. The higher the rank of the device, the better quality the video may be.

As previously described, new hardware and software appears in the market frequently. From new CPUs, new tablets, new laptops, faster RAM, and so on and those appearing after the time of model training (or between training stages when the model is continuously updated) would be unknown to the model. To handle new unseen devices in the model without model retraining, the system may update the category mapping dictionaries with the new categories. The changes in these dictionaries are a "minor" version change, since the model itself does not change. This allows for the inclusion of new category values, such as some new CPU name. Furthermore, in some examples, the model may be retrained again, with more data or even with different features. In some examples, the application features may have to be changed as hardware may be regrouped based upon this retraining.

As one example, the CPU identifier—e.g., "19-13900k" may be converted to a float number—e.g., 7.0. A CPU—say a "19-13900ks" may be introduced after the model is created. In these examples, the model may be retrained and the system may map the i9-13900ks to a similar float number (say 7.3) based upon its similarity to the I9-13900k and in some examples, based upon its similar core count and speeds. In other examples, an Apple® iPhone® 13 may map to a similar float value as an Apple® iPhone13® MAX and thus iPhone13® MAX® devices may be clustered with Apple® iPhone® 13 devices. This conversion between the float number and the CPU identifier may be stored in the dictionary. Prior to retraining the model, the CPU may be categorized as an unseen device.

FIG. 1 illustrates a system diagram 100 of a feature modification system based upon platform information according to some examples of the present disclosure. A configuration data store 105 stores a plurality of platform properties collected from computing devices that execute one or more application instances of one or more applications, such as application instance 140. E.g., platform properties such as hardware and software on which an application such as application instance 140 has executed. This platform information may be utilized by a capability service 110 to create a machine-learned model that classifies platforms into one or more clusters. For example, cluster analysis component 115 may apply a machine-learning model, such as a k-means model to produce clusters 117 from the platform properties. As previously noted, the cluster analysis component 115 may first encode platform properties that are textual or non-numeric using a conversion encoding algorithm to convert the text into a number such as a floating-point number. In these examples, similar text may produce similar numbers which reflects the observation that similar model numbers may provide similar performance. As noted, the cluster analysis component 115 produces a plurality of clusters 117.

Rank assignment component 120 may assign ranks to the plurality of clusters. The ranks indicate an expected performance of devices assigned to one of the particular clusters relative to devices assigned to one of the other clusters. In some examples, performance metrics may be used to assign the ranks. In some examples, platform properties of platforms that were not used to create the initial clusters may be used to generate the rankings. In some examples, the ranks may be manually assigned by administrators. In other examples, ranks may be automatically assigned based upon the performance metrics—e.g., by grouping clusters based upon their performance as evidenced by the performance metrics.

The model and rank mapping may be sent to an inference component 134 of a computing device 130. The inference component 134 may be a separate application from application instance 140, but in other examples, may be part of application instance 140. In examples in which the inference component 134 is separate from application instance 140, the rank produced by the inference component 134 to be used by multiple different applications. For example, a second application (different from the application of application instance 140) may also use the assignment of the rank or cluster to determine feature customization settings.

Inference component 134 uses the model and rank mapping along with platform properties 132 of the computing device 130 to determine a cluster assignment 136 of the platform of the computing device 130 into one of the clusters 117. The rank mapping component 138 then uses the cluster assignment and determines a rank based upon the rank mapping. This produces a rank which is passed to the application instance 140.

Feature template selection component 142 of application instance 140 may utilize the rank to select a feature template from a plurality of feature templates 144 based upon the rank. Feature templates 144 may be provided on computing device 130 as part of the application instance 140, downloaded separately, or the like. A particular feature template may be mapped to a particular rank and may specify a plurality of feature settings based upon that rank. The feature template that is selected may be used by the feature settings application component 146 to set, change, or adjust, one or more feature settings. For example, by changing one or more configuration files, updating one or more data structure properties or the like. These configuration files or data structures may be checked by the features in the application instance 140 while starting or executing to determine the appropriate settings.

Figure 2:
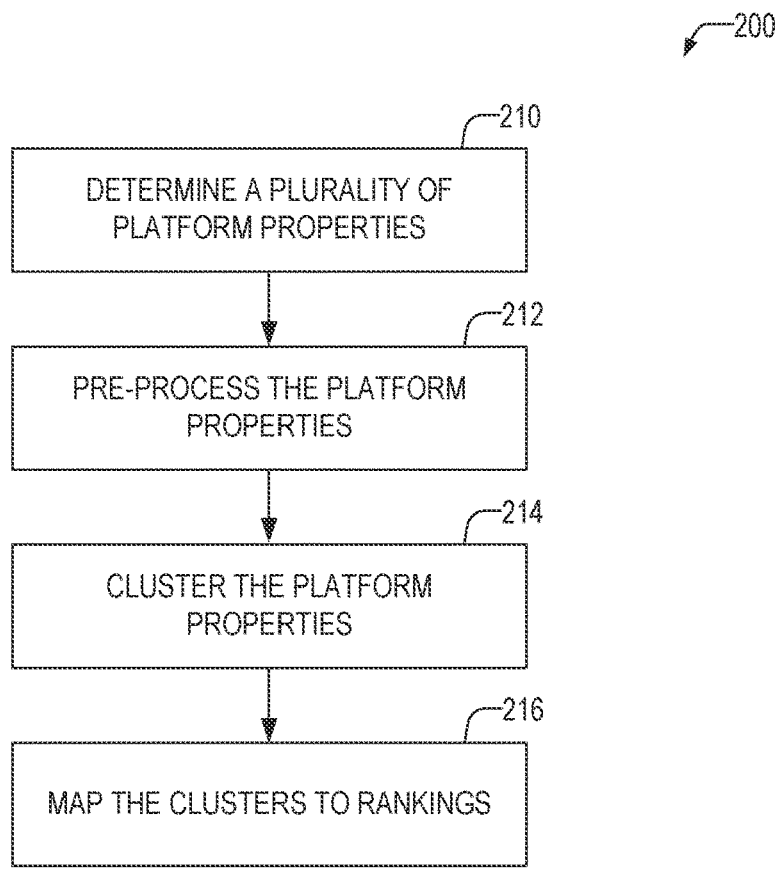
FIG. 2 illustrates a flowchart of a method of producing a feature capability cluster model according to some examples of the present disclosure.

FIG. 2 illustrates a flowchart of a method 200 of producing a feature capability cluster model according to some examples of the present disclosure. At operation 210 the system determines or identifies a plurality of platform properties. For example, an application may execute across a variety of different platforms and may collect this information and send it to an external service. The platform properties, as previously described may include hardware information and/or software platform information (such as operating system major and minor versions).

At operation 212, the system may pre-process the platform properties. For example, by converting non-numerical information to a floating point or other number. This may be done based upon a formula or other encoding algorithm (e.g., one-hot-encoding, or the like).

At operation 214, the system may cluster the platform properties into a plurality of clusters. In some examples, the number of clusters may be determined using a silhouette score or other analysis. In some examples, the clustering may be a partition-based clustering model such as K-means, K-nearest neighbors, shift clustering, or the like.

At operation 216, the clusters may be mapped to the rankings. In some examples, this operation may be performed with another set of platform information than used in operation 210, along with application performance metrics, such as CPU usage, RAM usage, and the like. The ranking of the clusters may be done manually or may be done using another machine-learning algorithm or model, such as a ranking model that utilizes the application performance metrics to determine which clusters perform better than other clusters.

Figure 3:
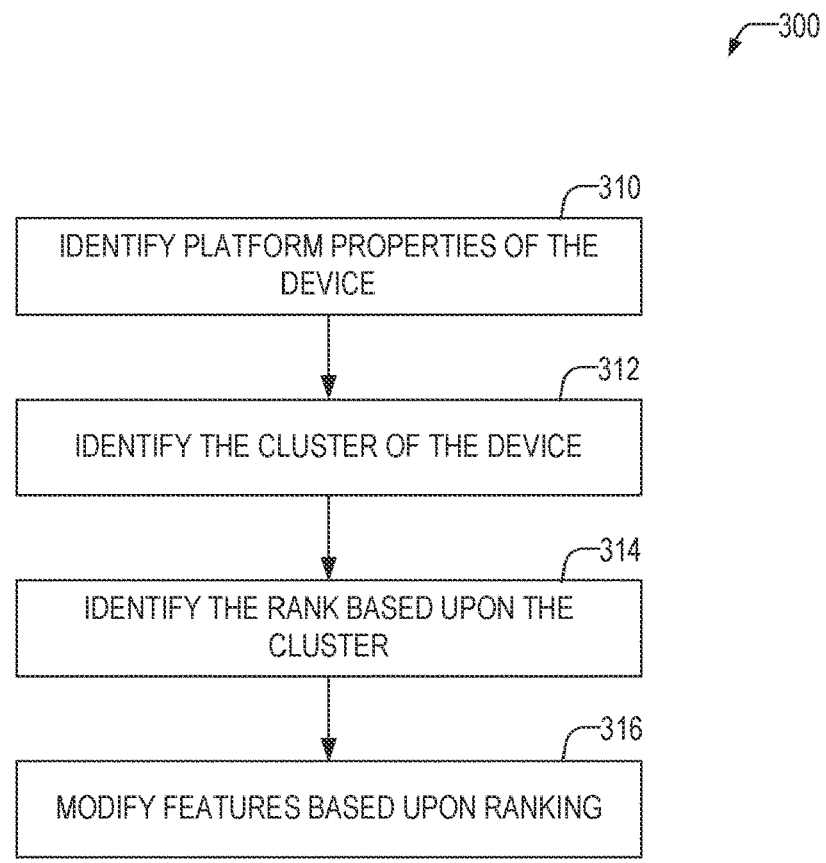
FIG. 3 illustrates a flowchart of a method for modifying features provided to a user of an application based upon a computing platform of a computing device of the user.

FIG. 3 illustrates a flowchart of a method 300 for modifying features provided to a user of an application based upon a computing platform of a computing device of the user. At operation 310, the system may identify computing platform properties of the device. The platform properties may include one or more hardware properties of one or more hardware devices on the computing device on which an application configured according to the present disclosure is being executed. As previously described hardware properties may include a CPU identifier, a number of CPU cores, a size of RAM, a type of RAM (DDR3, DDR4, DDR5), a speed of the RAM, a type of storage that the application is stored on or uses as storage; a speed of the storage that the application is stored on or uses as storage, and the like. Platform properties may include a software environment, such as for example, Operating System (O/S) information such as major and minor versions, whether the application is executing within a virtual machine, or the like.

At operation 312, the system may utilize the model to determine a cluster for the device using the platform properties such as the hardware properties and the model (e.g., the model created at operation 214). At operation 314, the cluster is used to find a rank of the cluster, and thus a rank of the device. At operation 316, based upon the ranking, one or more features are modified. Example modifications include disabling a feature, lowering a quality of a feature (e.g., lowering a video resolution, an audio quality, or the like), limiting the options available to a user within the feature, or the like.

Figure 4:
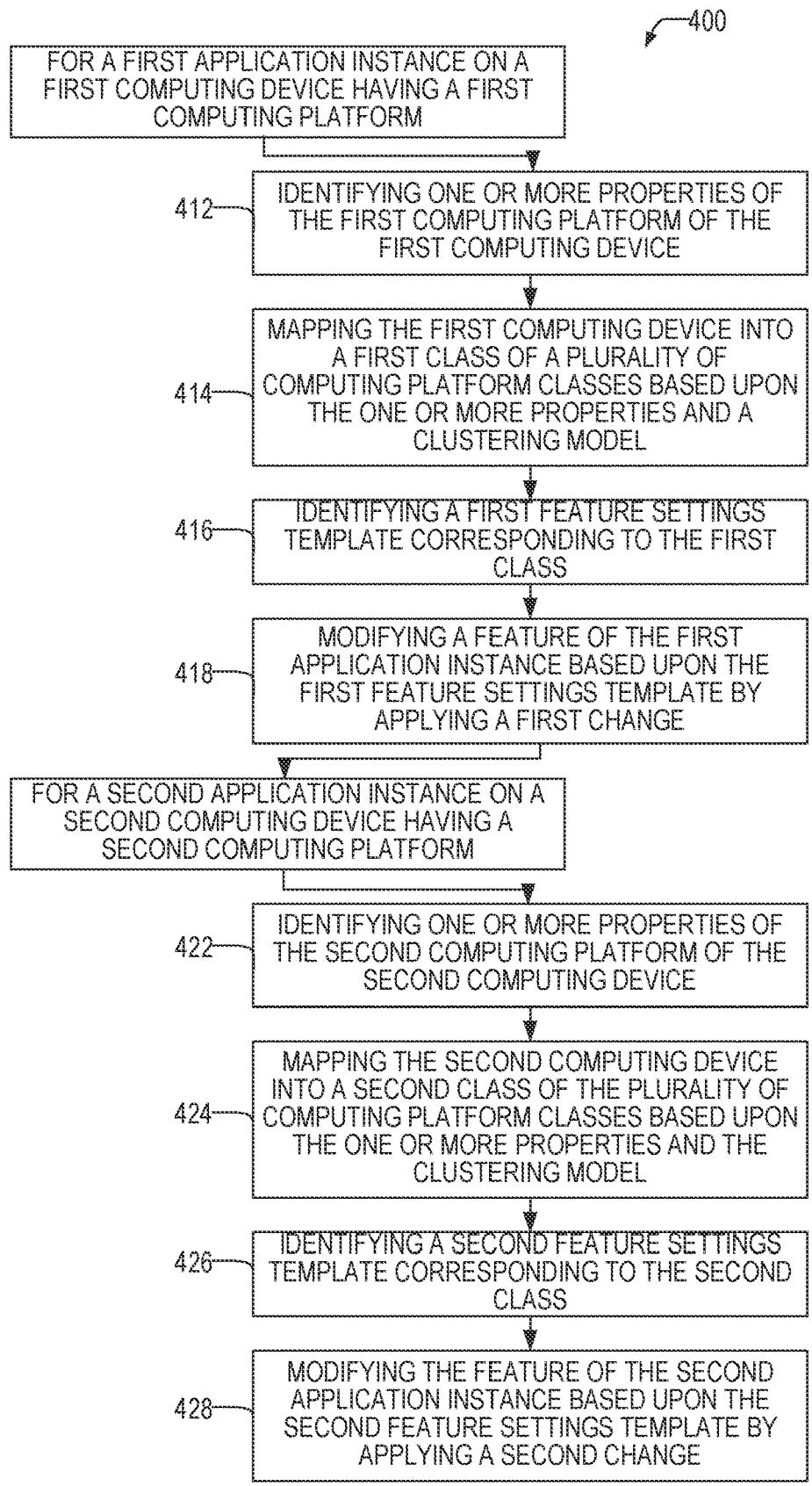
FIG. 4 illustrates a flowchart of a method modifying features of an application instance based upon a computing platform of a computing device executing the application instance according to some examples of the present disclosure.

FIG. 4 illustrates a flowchart of a method 400 modifying features of application instances based upon a computing platforms of computing devices executing the application instances of an application according to some examples of the present disclosure. The method 400 may be applied across one or more devices by one or more application instances. Application instances may be a particular copy of a same application. For example, a first copy of an application executing on a first computing device may be a first instance and a second copy of an application executing on a second computing device may be a second instance. In addition, an instance may be a copy of the application tailored to a different computing device. For example, a first instance may be a mobile-based application for mobile phones, a second instance a tablet-based application, a third instance a PC-based version, and a fourth instance a MAC® based version.

Operations 412-418 are performed for a first application instance on a first computing device having a first computing platform. At operation 412, the system identifies one or more properties of the first computing platform of the first computing device. In some examples, the first computing platform includes a plurality of hardware devices of the first computing device and the properties include hardware device properties. In some examples, the first computing platform includes a software platform and the properties include software properties. In some examples, the one or more properties do not include performance metrics of the first application instance executing on the first computing device or performance metrics of the device itself.

For example, the one or more properties may include hardware information, such as processor information such as: model (e.g., 32-bit, 64-bit, x86, Reduced Instruction Set Computer (RISC), Complex Instruction Set Computer (CISC), and the like), processor stepping, processor name (e.g., "19-13900k"®), processor code name (e.g., "Raptor Lake"®), max Total Design Power (TDP), socket type (e.g., Land Grid Array (LGA) 1700), processor family, processor model, stepping, extended family, extended model, revision, number of cores, base speed, turbo speed, instruction set supported, bus speed. Other hardware information includes RAM information such as type (e.g., DDR3, DDR4, DDR5), channels (e.g., 4×32-bit), RAM size (e.g., 8 GBytes, 16 GBytes, 32 Gbytes, and the like), RAM frequency, RAM timings (e.g., Column Address Strobe (CAS) latency, Row Address Strobe (RAS) to CAS Delay, and the like). Other hardware information includes motherboard information such as the manufacturer, model, chipset, Basic Input/Output System (BIOS) information, Unified Extensible Firmware Interface (UEFI) information, and the like. Still other hardware information may include graphics card information such as the Graphics Processing Unit (GPU) name, manufacturer, GPU code name, Revision, Total Design Power (TDP), core clocks, graphics memory size, graphics memory speed, graphics memory bus width, display resolution, display refresh rate, High Dynamic Range (HDR) support, and the like. Other properties of the computing platform may include an operating system (OS) major version, such as Microsoft Windows® 10, 11, Apple OS.

IOS, Android version, and the like. Minor versions of the OS may also be included, such as Windows 11 Pro, 22H2.

In some examples, the one or more properties are not metrics, or directly based upon metrics, of the application instance (or another application) executing on the computing platform. For example, the one or more properties may not include processor utilization, RAM utilization, GPU utilization, network utilization, jitter, quality, and the like that are collected to measure application instance performance. Note that, in some examples, these performance metrics, while not used to assign a particular computing platform to a cluster, may still be used to rank the various clusters during the model building phase. In some examples, these performance metrics may be used to modify a feature setting during application instance execution. In some examples, these performance metrics may not be used in assigning a computing platform to a cluster. The one or more properties may be determined prior to, or just after, the application begins executing, and before the features are configured and before metrics may be reliably calculated. For example, upon initial application initialization, upon application installation, upon a first execution of the application, and the like. For a network-based communication application, this may be prior to any network-based communication session. By utilizing these properties, rather than metrics, the application instance may be configured for the appropriate level of performance without collecting metrics that may impact performance of the application instance. Solutions using in-use metrics may start with inefficient settings that may be too demanding for the computing platform that it is running on, which may give poor performance.

At operation 414, the system maps the first computing device into a first class of a plurality of computing platform classes based upon the one or more properties of the first computing platform and a predefined clustering model. A computing platform may include the hardware of the computing device that the application instance is executing on and the software platform that provides services to the application. Example software platforms include the operating system and other software applications that interface with the software application instance. Example software applications that interface with the software application include drivers, frameworks (e.g., NET framework, JAVA frameworks), and for browser-based applications—the browsers executing the application instance.

At operation 416 the system identifies a first feature settings template corresponding to the first class based upon a mapping between the first class and the first feature settings template. In some examples, a feature settings template may be a list of a plurality of features and associated settings for those features. Each class and/or rank may be an associated feature settings template that customizes an instance of the application based upon the settings embedded therein.

At operation 418 the system modifies a feature of the first application instance based upon the first feature settings template, wherein modifying the feature of the first application instance comprises applying a first change to the feature. For example, the first change is specified for the feature in the feature settings template.

Operations 422-428 may be performed for a second application instance running on a second computing device having a second computing platform. At operation 422, the system may identify one or more properties of the second computing platform of the second computing device. In some examples, the second computing platform includes a plurality of hardware devices of the second computing device and the properties include hardware device properties. In some examples, the second computing platform includes a software platform and the properties include software properties. In some examples, the one or more properties do not include performance metrics of the software application instance executing on the second computing device or performance metrics of the device itself.

At operation 424, the system may map the second computing device into a second class of the plurality of computing platform classes based upon the second one or more properties and the predefined clustering model, the second-class comprising computing platforms that are judged less capable than computing platforms of the first class. For example, the rank assigned to the second class may be a lower rank than the first class—where higher ranked classes feature more capable computing platforms that can handle increased computational workloads of some features.

At operation 426, the system may identify a second feature settings template corresponding to the second class based upon a mapping between the second class and the second feature settings template. At operation 428, the system may modify the feature of the second application instance based upon the second feature settings template, wherein modifying the feature of the second application instance comprises applying a second change to the feature, wherein the second class of the plurality of computing platform classes is a lower class than the first class and wherein the second change modifies the feature to require fewer operating resources than the first change.

As noted, the feature settings templates include mappings between various classes and various features and customizations (e.g., settings) to customize an application's settings for a particular computing platform. These mappings may be specific to each feature and each developer that owns a particular feature of an application may set these mappings based upon in-use metrics of the feature within the application.

Figure 5:
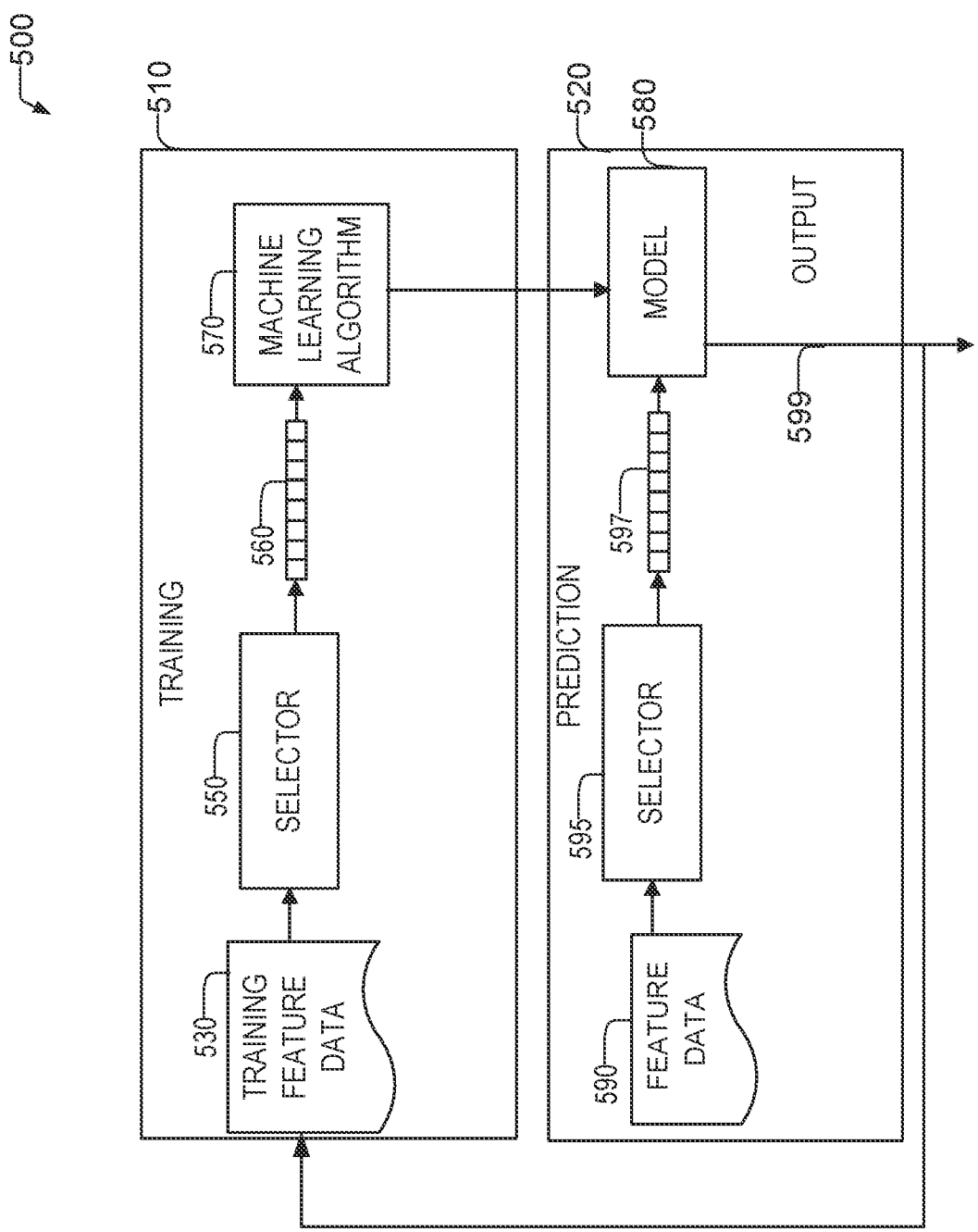
FIG. 5 shows an example machine learning module according to some examples of the present disclosure.

FIG. 5 shows an example machine learning component 500 according to some examples of the present disclosure. The machine learning component 500 may be implemented in whole or in part by one or more computing devices. In some examples, the training component 510 may be implemented by a different device than the prediction component 520. In these examples, the model 580 may be created on a first machine and then sent to a second machine. In some examples, one or more portions of the machine learning component 500 may be implemented by one or more components from FIG. 2.

In some examples, machine learning component 500 utilizes a training component 510 and a prediction component 520. Training component 510 inputs training feature data 530 into selector component 550. The training feature data 530 may include one or more sets of training data. The training feature data 530 may be labeled with the desired output. In other examples, the training data may not be labeled, and the model may be trained using unsupervised methods and/or feedback data—such as through a reinforcement learning method. The feedback data may be a measure of error between a desired result of the algorithm and the actual result.

Selector component 550 converts and/or selects training vector 560 from the training feature data 530. For example, the selector component 550 may filter, select, transform, process, or otherwise convert the training data. For example, the selector component 550 may apply one or more feature selection algorithms to find features in the training data. The selected data may fill training vector 560 and comprises a set of the training data that is determined to be predictive of a result. Information chosen for inclusion in the training vector 560 may be all the training feature data 530 or in some examples, may be a subset of all the training feature data 530. Selector component 550 may also convert or otherwise process the training feature data 530 such as normalization, encoding, and the like. The training vector 560 may be utilized (along with any applicable labels) by the machine learning algorithm 570 to produce a model 580. In some examples, other data structures other than vectors may be used. The machine learning algorithm 570 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected.

In the prediction component 520, feature data 590 is input to the selector component 595. Selector component 595 may operate the same, or differently than selector component 550. In some examples, selector components 550 and 595 are the same components or different instances of the same component. Selector component 595 produces vector 597, which is input into the model 580 to produce an output 599. For example, the weightings and/or network structure learned by the training component 510 may be executed on the vector 597 by applying vector 597 to a first layer of the model 580 to produce inputs to a second layer of the model 580, and so on until the encoding is output. As previously noted, other data structures may be used other than a vector (e.g., a matrix).

The training component 510 may operate in an offline manner to train the model 580. The prediction component 520, however, may be designed to operate in an online manner. It should be noted that the model 580 may be periodically updated via additional training and/or user feedback. For example, additional training feature data 530 may be collected as users provide feedback on the performance of the predictions.

The machine learning algorithm 570 may be selected from among many different potential supervised or unsupervised machine learning algorithms. Examples of learning algorithms include artificial neural networks, Generative Pretrained Transformer (GPT), convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, k-means, linear regression, logistic regression, a region based CNN, a full CNN (for semantic segmentation), a mask R-CNN algorithm for instance segmentation, Latent Dirichlet Algorithm (LDA), and hidden Markov models. Examples of unsupervised learning algorithms include expectation-maximization algorithms, vector quantization, and information bottleneck method.

As noted, the machine-learning model may be used to build a clustering model to cluster computing platforms into a plurality of clusters. In some examples, the training component 510 may be an unsupervised component in that the training feature data 530 is not labeled. In some examples, the training feature data 530 comprises properties of a plurality of computing platforms executing the software application from before the methods disclosed in this application are deployed. The number of clusters may be determined using one or more metrics, such as a silhouette score. In some examples, in-use application metrics, such as processor utilization, RAM utilization, GPU utilization, network utilization, jitter, quality, and the like that are collected while the application instance is executing may also be also included in the training component 510. In these examples, the feature data 590 are properties of a computing platform where an application instance was installed, or started executing (e.g., for the first time). The output 599 may be a cluster identifier of a cluster. That cluster may be converted (e.g., by a mapping) to a rank. The rank may then be used to select a feature settings template that applies one or more feature settings to one or more features of the application instance.

Figure 6:
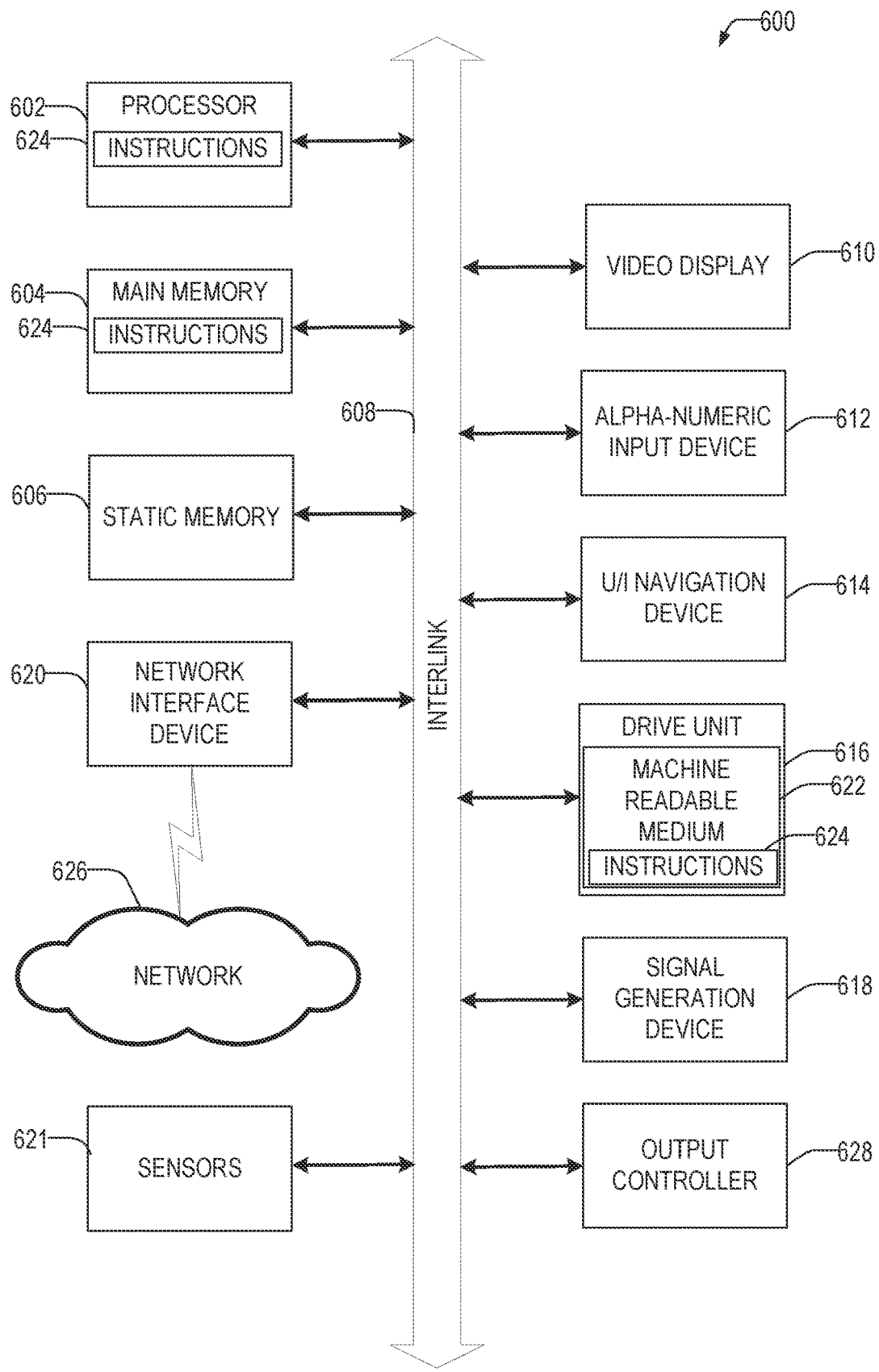
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be in the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 600 may be or implement (either through hardware, software, or a combination): the configuration data store 105, capability service 110, computing device 130, the methods 200, 300, 400; and either one or both of the machine-learning components of FIG. 5.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 600 may include one or more hardware processors, such as processor 602. Processor 602 may be a central processing unit (CPU), a graphics processing unit (GPU), a hardware processor core, or any combination thereof. Machine 600 may include a main memory 604 and a static memory 606, some or all of which may communicate with each other via an interlink (e.g., bus) 608. Examples of main memory 604 may include Synchronous Dynamic Random-Access Memory (SDRAM), such as Double Data Rate memory, such as DDR4 or DDR5. Interlink 608 may be one or more different types of interlinks such that one or more components may be connected using a first type of interlink and one or more components may be connected using a second type of interlink Example interlinks may include a memory bus, a peripheral component interconnect (PCI), a peripheral component interconnect express (PCIe) bus, a universal serial bus (USB), or the like.

The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD), and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620. The Machine 600 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g, Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

Other Notes and Examples

Example 1 is a method for modifying features of an application instance based upon an computing platform of a computing device executing the application instance, the method comprising: for a first application instance on a first computing device having a first computing platform: identifying one or more properties of the first computing platform of the first computing device, the first computing platform including a plurality of hardware devices of the first computing device, the one or more properties not including performance metrics of the first application instance executing on the first computing device; mapping the first computing device into a first class of a plurality of computing platform classes based upon the one or more properties of the first computing platform and a predefined clustering model; identifying a first feature settings template corresponding to the first class based upon a mapping between the first class and the first feature settings template; and modifying a feature of the first application instance based upon the first feature settings template, wherein modifying the feature of the first application instance comprises applying a first change to the feature; for a second application instance on a second computing device having a second computing platform: identifying second one or more properties of the second computing platform of the second computing device, the second computing platform including a plurality of hardware devices of the second computing device, the one or more properties not including performance metrics of the second application instance executing on the second computing device; mapping the second computing device into a second class of the plurality of computing platform classes based upon the second one or more properties and the predefined clustering model, the second class comprising computing platforms that are judged less capable than computing platforms of the first class; identifying a second feature settings template corresponding to the second class based upon a mapping between the second class and the second feature settings template; and modifying the feature of the second application instance based upon the second feature settings template, wherein modifying the feature of the second application instance comprises applying a second change to the feature, wherein the second class of the plurality of computing platform classes is a lower class than the first class and wherein the second change modifies the feature to require less operating resources than the first change.

In Example 2, the subject matter of Example 1 includes, wherein modifying the feature of the second application instance comprises disabling the feature.

In Example 3, the subject matter of Examples 1-2 includes, wherein modifying the feature of the second application instance comprises changing a quality level of the feature.

In Example 4, the subject matter of Examples 1-3 includes, identifying one or more properties of a plurality of computing platforms from a plurality of computing devices; clustering the plurality of computing platforms to create the predefined clustering model; and assigning ranks to each of the clusters based upon a plurality of performance metrics collected from previous application instance executions.

In Example 5, the subject matter of Example 4 includes, determining a number of clusters using a silhouette score.

In Example 6, the subject matter of Examples 1-5 includes, observing performance metrics during execution of the second application instance on the second computing device; determining that the performance metrics meet a prespecified threshold; and responsive to determining that the performance metrics meet the prespecified threshold, modifying the feature of the second application instance by applying the first change to the feature.

In Example 7, the subject matter of Example 6 includes, wherein applying the first change comprises enabling the feature.

In Example 8, the subject matter of Examples 1-7 includes, wherein a particular one of the plurality of hardware devices of the first computing device is not contained in the model, and wherein the method further comprises: utilizing a similarity in a name of the particular one of the plurality of hardware devices and one or more performance characteristics of the particular one of the plurality of hardware devices to a second hardware device contained in the model and grouping the particular one of the plurality of hardware devices with the second hardware device based upon the similarity.

In Example 9, the subject matter of Examples 1-8 includes, modifying a second feature of the first application instance based upon the first feature settings template and modifying the second feature of the second application instance based upon the second feature settings template.

In Example 10, the subject matter of Examples 1-9 includes, wherein the computing platform further comprises an operating system version.

Example 11 is a system for modifying features of an application instance based upon an computing platform of a computing device executing the application instance, the system comprising: a first computing device having a first computing platform executing a first application instance, comprising: a first hardware processor; a first memory device, storing instructions, which when executed by the first hardware processor, cause the first computing device to perform operations comprising: identifying one or more properties of the first computing platform of the first computing device, the first computing platform including a plurality of hardware devices of the first computing device, the one or more properties not including performance metrics of the first application instance executing on the first computing device; mapping the first computing device into a first class of a plurality of computing platform classes based upon the one or more properties of the first computing platform and a predefined clustering model; identifying a first feature settings template corresponding to the first class based upon a mapping between the first class and the first feature settings template; and modifying a feature of the first application instance based upon the first feature settings template, wherein modifying the feature of the first application instance comprises applying a first change to the feature; a second computing device having a second computing platform executing a second application instance, comprising: a second hardware processor; a second memory device, storing instructions, which when executed by the second hardware processor, cause the second computing device to perform operations comprising: identifying second one or more properties of the second computing platform of the second computing device, the second computing platform including a plurality of hardware devices of the second computing device, the one or more properties not including performance metrics of the second application instance executing on the second computing device; mapping the second computing device into a second class of the plurality of computing platform classes based upon the second one or more properties and the predefined clustering model, the second class comprising computing platforms that are judged less capable than computing platforms of the first class; identifying a second feature settings template corresponding to the second class based upon a mapping between the second class and the second feature settings template; and modifying the feature of the second application instance based upon the second feature settings template, wherein modifying the feature of the second application instance comprises applying a second change to the feature, wherein the second class of the plurality of computing platform classes is a lower class than the first class and wherein the second change modifies the feature to require less operating resources than the first change.

In Example 12, the subject matter of Example 11 includes, wherein the operations of modifying the feature of the second application instance comprises disabling the feature.

In Example 13, the subject matter of Examples 11-12 includes, wherein the operations of modifying the feature of the second application instance comprises changing a quality level of the feature.

In Example 14, the subject matter of Examples 11-13 includes, wherein the operations further comprise: identifying one or more properties of a plurality of computing platforms from a plurality of computing devices; clustering the plurality of computing platforms to create the predefined clustering model; and assigning ranks to each of the clusters based upon a plurality of performance metrics collected from previous application instance executions.

In Example 15, the subject matter of Example 14 includes, wherein the operations further comprise determining a number of clusters using a silhouette score.

In Example 16, the subject matter of Examples 11-15 includes, wherein the operations further comprise: observing performance metrics during execution of the second application instance on the second computing device; determining that the performance metrics meet a prespecified threshold; and responsive to determining that the performance metrics meet the prespecified threshold, modifying the feature of the second application instance by applying the first change to the feature.

In Example 17, the subject matter of Example 16 includes, wherein the operations of applying the first change comprises enabling the feature.

In Example 18, the subject matter of Examples 11-17 includes, wherein a particular one of the plurality of hardware devices of the first computing device is not contained in the model, and wherein the operations further comprise: utilizing a similarity in a name of the particular one of the plurality of hardware devices and one or more performance characteristics of the particular one of the plurality of hardware devices to a second hardware device contained in the model and grouping the particular one of the plurality of hardware devices with the second hardware device based upon the similarity.

In Example 19, the subject matter of Examples 11-18 includes, wherein the operations further comprise: modifying a second feature of the first application instance based upon the first feature settings template and modifying the second feature of the second application instance based upon the second feature settings template.

In Example 20, the subject matter of Examples 11-19 includes, wherein the computing platform further comprises an operating system version.

Example 21 is a system for modifying features of an application instance based upon an computing platform of a computing device executing the application instance, the system comprising: for a first application instance on a first computing device having a first computing platform: means for identifying one or more properties of the first computing platform of the first computing device, the first computing platform including a plurality of hardware devices of the first computing device, the one or more properties not including performance metrics of the first application instance executing on the first computing device; means for mapping the first computing device into a first class of a plurality of computing platform classes based upon the one or more properties of the first computing platform and a predefined clustering model; means for identifying a first feature settings template corresponding to the first class based upon a mapping between the first class and the first feature settings template; and means for modifying a feature of the first application instance based upon the first feature settings template, wherein modifying the feature of the first application instance comprises applying a first change to the feature; for a second application instance on a second computing device having a second computing platform: means for identifying second one or more properties of the second computing platform of the second computing device, the second computing platform including a plurality of hardware devices of the second computing device, the one or more properties not including performance metrics of the second application instance executing on the second computing device; means for mapping the second computing device into a second class of the plurality of computing platform classes based upon the second one or more properties and the predefined clustering model, the second class comprising computing platforms that are judged less capable than computing platforms of the first class; means for identifying a second feature settings template corresponding to the second class based upon a mapping between the second class and the second feature settings template; and means for modifying the feature of the second application instance based upon the second feature settings template, wherein modifying the feature of the second application instance comprises applying a second change to the feature, wherein the second class of the plurality of computing platform classes is a lower class than the first class and wherein the second change modifies the feature to require less operating resources than the first change.

In Example 22, the subject matter of Example 21 includes, wherein the means for modifying the feature of the second application instance comprises means for disabling the feature.

In Example 23, the subject matter of Examples 21-22 includes, wherein the means for modifying the feature of the second application instance comprises means for changing a quality level of the feature.

In Example 24, the subject matter of Examples 21-23 includes, means for identifying one or more properties of a plurality of computing platforms from a plurality of computing devices; means for clustering the plurality of computing platforms to create the predefined clustering model; and means for assigning ranks to each of the clusters based upon a plurality of performance metrics collected from previous application instance executions.

In Example 25, the subject matter of Example 24 includes, means for determining a number of clusters using a silhouette score.

In Example 26, the subject matter of Examples 21-25 includes, means for observing performance metrics during execution of the second application instance on the second computing device; means for determining that the performance metrics meet a prespecified threshold; and means for, responsive to determining that the performance metrics meet the prespecified threshold, modifying the feature of the second application instance by applying the first change to the feature.

In Example 27, the subject matter of Example 26 includes, wherein the means for applying the first change comprises means for enabling the feature.

In Example 28, the subject matter of Examples 21-27 includes, wherein a particular one of the plurality of hardware devices of the first computing device is not contained in the model, and wherein the system further comprises: means for utilizing a similarity in a name of the particular one of the plurality of hardware devices and one or more performance characteristics of the particular one of the plurality of hardware devices to a second hardware device contained in the model and grouping the particular one of the plurality of hardware devices with the second hardware device based upon the similarity.

In Example 29, the subject matter of Examples 21-28 includes, means for modifying a second feature of the first application instance based upon the first feature settings template and modifying the second feature of the second application instance based upon the second feature settings template.

In Example 30, the subject matter of Examples 21-29 includes, wherein the computing platform further comprises an operating system version.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

What is claimed is:

1. A method for modifying features of an application instance based upon an computing platform of a computing device executing the application instance, the method comprising:
    for a first application instance on a first computing device having a first computing platform:
        identifying one or more properties of the first computing platform of the first computing device, the first computing platform including a plurality of hardware devices of the first computing device, the one or more properties not including performance metrics of the first application instance executing on the first computing device;
        mapping the first computing device into a first class of a plurality of computing platform classes based upon the one or more properties of the first computing platform and a predefined clustering model;
        identifying a first feature settings template corresponding to the first class based upon a mapping between the first class and the first feature settings template; and
        modifying a feature of the first application instance based upon the first feature settings template, wherein modifying the feature of the first application instance comprises applying a first change to the feature;
    for a second application instance on a second computing device having a second computing platform:
        identifying second one or more properties of the second computing platform of the second computing device, the second computing platform including a plurality of hardware devices of the second computing device, the one or more properties not including performance metrics of the second application instance executing on the second computing device;
        mapping the second computing device into a second class of the plurality of computing platform classes based upon the second one or more properties and the predefined clustering model, the second class comprising computing platforms that are judged less capable than computing platforms of the first class;
        identifying a second feature settings template corresponding to the second class based upon a mapping between the second class and the second feature settings template; and
        modifying the feature of the second application instance based upon the second feature settings template, wherein modifying the feature of the second application instance comprises applying a second change to the feature, wherein the second class of the plurality of computing platform classes is a lower class than the first class and wherein the second change modifies the feature to require less operating resources than the first change.

2. The method of claim 1, wherein modifying the feature of the second application instance comprises disabling the feature.

3. The method of claim 1, wherein modifying the feature of the second application instance comprises changing a quality level of the feature.

4. The method of claim 1, further comprising:
identifying one or more properties of a plurality of computing platforms from a plurality of computing devices;
clustering the plurality of computing platforms to create the predefined clustering model; and
assigning ranks to each of the clusters based upon a plurality of performance metrics collected from previous application instance executions.

5. The method of claim 4, further comprising determining a number of clusters using a silhouette score.

6. The method of claim 1, further comprising:
observing performance metrics during execution of the second application instance on the second computing device;
determining that the performance metrics meet a prespecified threshold; and
responsive to determining that the performance metrics meet the prespecified threshold, modifying the feature of the second application instance by applying the first change to the feature.

7. The method of claim 6, wherein applying the first change comprises enabling the feature.

8. The method of claim 1, wherein a particular one of the plurality of hardware devices of the first computing device is not contained in the model, and wherein the method further comprises:
utilizing a similarity in a name of the particular one of the plurality of hardware devices and one or more performance characteristics of the particular one of the plurality of hardware devices to a second hardware device contained in the model and grouping the particular one of the plurality of hardware devices with the second hardware device based upon the similarity.

9. The method of claim 1, further comprising:
modifying a second feature of the first application instance based upon the first feature settings template and modifying the second feature of the second application instance based upon the second feature settings template.

10. The method of claim 1, wherein the computing platform further comprises an operating system version.

11. A system for modifying features of an application instance based upon an computing platform of a computing device executing the application instance, the system comprising:
a first computing device having a first computing platform executing a first application instance, comprising:
a first hardware processor;
a first memory device, storing instructions, which when executed by the first hardware processor, cause the first computing device to perform operations comprising:
identifying one or more properties of the first computing platform of the first computing device, the first computing platform including a plurality of hardware devices of the first computing device, the one or more properties not including performance metrics of the first application instance executing on the first computing device;
mapping the first computing device into a first class of a plurality of computing platform classes based upon the one or more properties of the first computing platform and a predefined clustering model;
identifying a first feature settings template corresponding to the first class based upon a mapping between the first class and the first feature settings template; and
modifying a feature of the first application instance based upon the first feature settings template, wherein modifying the feature of the first application instance comprises applying a first change to the feature;
a second computing device having a second computing platform executing a second application instance, comprising:
a second hardware processor;
a second memory device, storing instructions, which when executed by the second hardware processor, cause the second computing device to perform operations comprising:
identifying second one or more properties of the second computing platform of the second computing device, the second computing platform including a plurality of hardware devices of the second computing device, the one or more properties not including performance metrics of the second application instance executing on the second computing device;
mapping the second computing device into a second class of the plurality of computing platform classes based upon the second one or more properties and the predefined clustering model, the second class comprising computing platforms that are judged less capable than computing platforms of the first class;
identifying a second feature settings template corresponding to the second class based upon a mapping between the second class and the second feature settings template; and
modifying the feature of the second application instance based upon the second feature settings template, wherein modifying the feature of the second application instance comprises applying a second change to the feature, wherein the second class of the plurality of computing platform classes is a lower class than the first class and wherein the second change modifies the feature to require less operating resources than the first change.

12. The system of claim 11, wherein the operations of modifying the feature of the second application instance comprises disabling the feature.

13. The system of claim 11, wherein the operations of modifying the feature of the second application instance comprises changing a quality level of the feature.

14. The system of claim 11, wherein the operations further comprise:
identifying one or more properties of a plurality of computing platforms from a plurality of computing devices;
clustering the plurality of computing platforms to create the predefined clustering model; and assigning ranks to each of the clusters based upon a plurality of performance metrics collected from previous application instance executions.

15. The system of claim 14, wherein the operations further comprise determining a number of clusters using a silhouette score.

16. The system of claim 11, wherein the operations further comprise:
observing performance metrics during execution of the second application instance on the second computing device;
determining that the performance metrics meet a prespecified threshold; and
responsive to determining that the performance metrics meet the prespecified threshold, modifying the feature of the second application instance by applying the first change to the feature.

17. The system of claim 16, wherein the operations of applying the first change comprises enabling the feature.

18. The system of claim 11, wherein a particular one of the plurality of hardware devices of the first computing device is not contained in the model, and wherein the operations further comprise:
utilizing a similarity in a name of the particular one of the plurality of hardware devices and one or more performance characteristics of the particular one of the plurality of hardware devices to a second hardware device contained in the model and grouping the particular one of the plurality of hardware devices with the second hardware device based upon the similarity.

19. The system of claim 11, wherein the operations further comprise:
modifying a second feature of the first application instance based upon the first feature settings template and modifying the second feature of the second application instance based upon the second feature settings template.

20. The method of claim 11, wherein the computing platform further comprises an operating system version.

* * * * *